United States Patent
Ayars

(10) Patent No.: US 7,822,773 B2
(45) Date of Patent: Oct. 26, 2010

(54) METHOD AND SYSTEM FOR REDUCING COMPLEX TREE STRUCTURES TO SIMPLE TREE STRUCTURES BASED ON RELEVANCE OF NODES USING THRESHOLD VALUES

(75) Inventor: Frank Raymond Ayars, Corona, CA (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/020,473

(22) Filed: Jan. 25, 2008

(65) Prior Publication Data
US 2009/0193010 A1 Jul. 30, 2009

(51) Int. Cl.
G06F 17/30 (2006.01)

(52) U.S. Cl. ............... 707/790; 707/791; 707/797; 707/999.005

(58) Field of Classification Search ......... 707/790, 707/791, 797, 999.005
See application file for complete search history.

(56) References Cited

U.S. PATENT DOCUMENTS

| | | | |
|---|---|---|---|
| 5,258,982 A | 11/1993 | Britton et al. | |
| 5,301,318 A | 4/1994 | Mittal | |
| 6,154,750 A | 11/2000 | Roberge et al. | |
| 6,219,826 B1 | 4/2001 | De Pauw et al. | |
| 6,314,424 B1 | 11/2001 | Kaczmarski et al. | |
| 6,380,957 B1 | 4/2002 | Banning | |
| 6,381,611 B1 | 4/2002 | Roberge et al. | |
| 6,567,815 B1 | 5/2003 | Rubin et al. | |
| 6,931,418 B1* | 8/2005 | Barnes | 1/1 |
| 6,963,339 B2 | 11/2005 | Leah et al. | |
| 7,047,287 B2* | 5/2006 | Sim et al. | 709/221 |
| 7,174,328 B2* | 2/2007 | Stanoi et al. | 1/1 |
| 7,460,538 B2* | 12/2008 | Takatsu et al. | 370/392 |
| 7,613,602 B2* | 11/2009 | Kanawa | 704/9 |
| 2004/0215609 A1* | 10/2004 | Takatsu et al. | 707/3 |
| 2005/0050016 A1* | 3/2005 | Stanoi et al. | 707/3 |
| 2006/0129569 A1 | 6/2006 | Dieberger et al. | |
| 2008/0071840 A1* | 3/2008 | Srikanth et al. | 707/200 |
| 2008/0281834 A1* | 11/2008 | Wu et al. | 707/100 |

OTHER PUBLICATIONS

Dieberger, Andreas, et al., System and Method for Partially Collapsing a Hierarchical Structure for Information Navigation, IBM Corporation, 7 pages.

Trekhov, A., "Mapping Directed Graph to a Tree", IBM Corporation, 2 pages.

International Business Machines Corporation, "User Interface Control to Customize the Expansion of a Tree View", Research Disclosure, Oct. 2001, pp. 1786-1787.

* cited by examiner

Primary Examiner—Jean M Corrielus
(74) Attorney, Agent, or Firm—Sawyer Law Group, P.C.

(57) ABSTRACT

The present invention discloses a method for reducing a tree structure in a processing system. The method includes providing a plurality of nodes in a tree structure. The method also includes querying each of the plurality of nodes based upon a threshold value, wherein the threshold is related to relevance; when a count of a particular node matches the threshold then a next child node is queried to determine if the next child node matches the threshold, if a child node does not exist for the queried node when the node is displayed. The method further includes visiting all of the parent nodes based on the querying step until all of plurality of nodes have been queried. The method finally includes displaying the nodes that satisfy the threshold value.

3 Claims, 3 Drawing Sheets

306

METHOD AND SYSTEM FOR REDUCING COMPLEX TREE STRUCTURES TO SIMPLE TREE STRUCTURES BASED ON RELEVANCE OF NODES USING THRESHOLD VALUES

FIELD OF THE INVENTION

The present invention relates to generally to a database in a processing system and more particularly to analyzing tree structures in a database.

BACKGROUND OF THE INVENTION

Tree structure hierarchies in a database of a processing system are utilized in a variety of environments. There are problems in analyzing these structures particularly as they increase in size. One problem is how to find the areas within a complex tree structure (taxonomy) that hold specific data. An example from the area of record management analyses is this. A client would like to know where all of the records that are placed on hold are located. These on-hold records may be located in a small set of folders. The folders may also provide important contextual organizational information about the contained records. However, that small set of folders may be embedded in a very large hierarchy of folders. Manually searching through the hierarchy for the on-hold records would be cumbersome. Executing a property-based search is another approach. However, that may return more records than is tenable for human consumption. Accordingly, what is desired is a system and method that simplifies the tree structure to allow for human analysis The present invention addresses such a need.

SUMMARY OF THE INVENTION

The present invention discloses a method for reducing a tree structure in a processing system. The method includes providing a plurality of nodes in a tree structure. The method also includes querying each of the plurality of nodes based upon a threshold value, wherein the threshold is related to relevance; when a count of a particular node matches the threshold then a next child node is queried to determine if the next child node matches the threshold, if a child node does not exist for the queried node when the node is displayed. The method further includes visiting all of the parent nodes based on the querying step until all of plurality of nodes have been queried. The method finally includes displaying the nodes that satisfy the threshold value.

Accordingly, a process is provided that reduces a complex tree structure for a simple tree structure that is easily viewed and understood by utilizing relevance information, important information that can be understood.

DETAILED DESCRIPTION OF PREFERRED EMBODIMENTS

Figure 1:
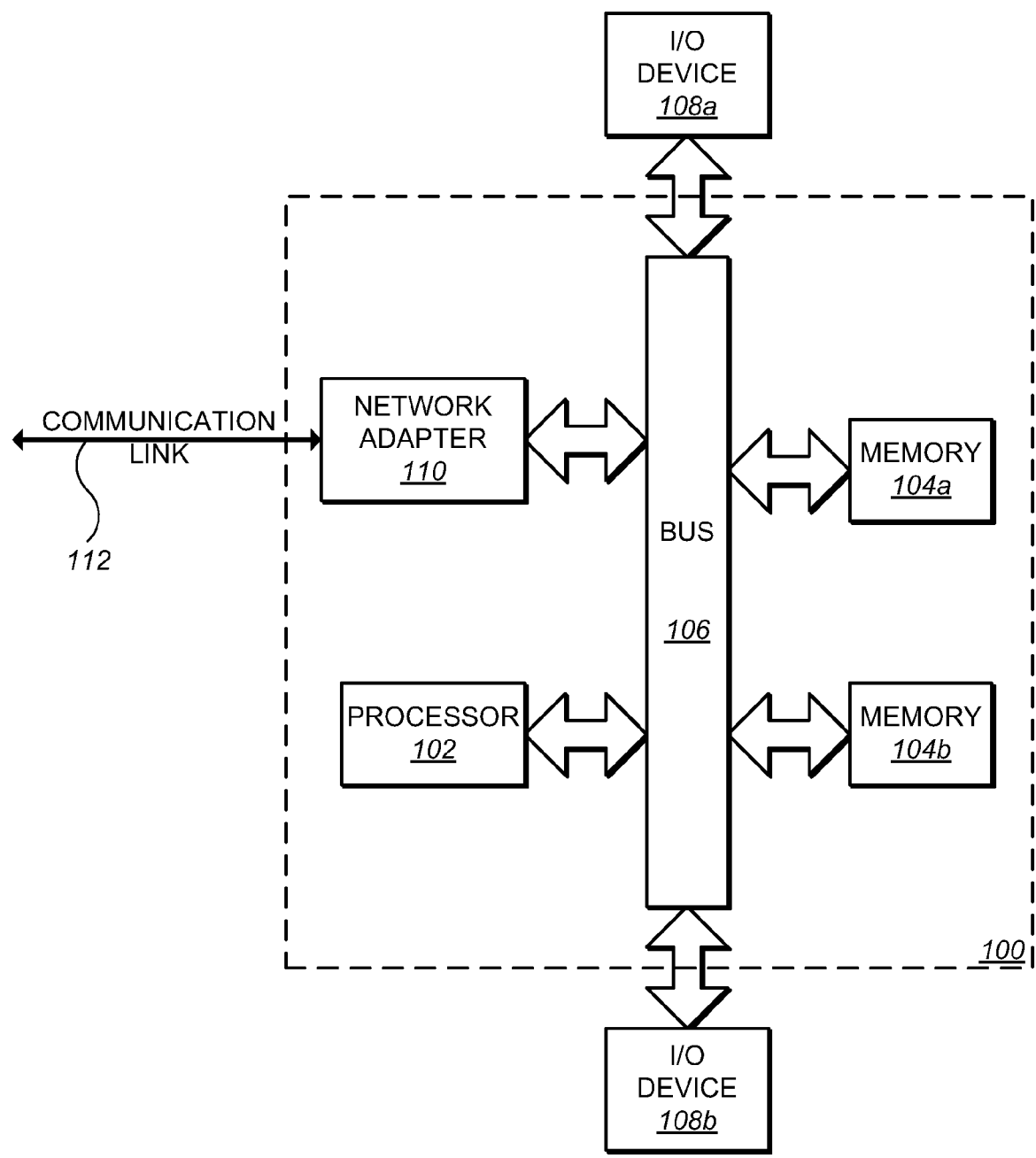
FIG. 1 depicts a data processing system suitable for storing and/or executing program code related to the tree structure reducing process.

The present invention relates to generally to a database in a processing system and more particularly to analyzing tree structures in a database. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention reduces the tree structure to a structure simple enough to allow for human consumption and analysis. In an example, reducing the tree, for example, to the small set of folders that contain the records placed on hold would be the solution. Note that the small set of folders may directly contain the records or indirectly through sub record categories. The point is that you return the tree nodes that are most relevant and allow the client to drill-down from there. This is one example, but this can be applied in many ways. Rather than records placed on hold as the criteria, you can substitute any record management rule. For instance, the rule may be to find the relevant record categories where the contained records will be disposed of in the following week. A non-records management example is from an OS folder system such as Windows Explorer. In this example, the client may want to discover the relevant folders containing 3 GB of data or more. By this the client will discover the relevant areas that contain the majority of data. To describe the features of the present invention in more detail refer now to the following description in conjunction with the accompanying figures.

A system that utilizes the tree structure reducing process in accordance with the present invention can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this tree structure reducing process can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

FIG. 1 depicts a data processing system 100 suitable for storing and/or executing program code related to the tree structure reducing process. Data processing system 100 includes a processor 102 coupled to memory elements 104a-104b through a system bus 106. In other implementations, data processing system 100 may include more than one processor and each processor may be coupled directly or indirectly to one or more memory elements through a system bus.

Memory elements 104a-104b can include local memory employed during actual execution of the program code, bulk storage, and cache memories that provide temporary storage of at least some program code in order to reduce the number of times the code must be retrieved from bulk storage during execution, As shown, input/output or I/O devices 108a-108b are coupled to data processing system 100. I/O devices 108a-108b may be coupled to data processing system 100 directly or indirectly through intervening I/O controllers (not shown).

In the implementation, a network adapter 110 is coupled to data processing system 100 to enable data processing system 100 to become coupled to other data processing systems or remote printers or storage devices through communications link 112. Communication link 112 can be a private or public network. Modems, cable modems, and Ethernet cards are just a few of the currently available types of network adapters.

Figure 2:
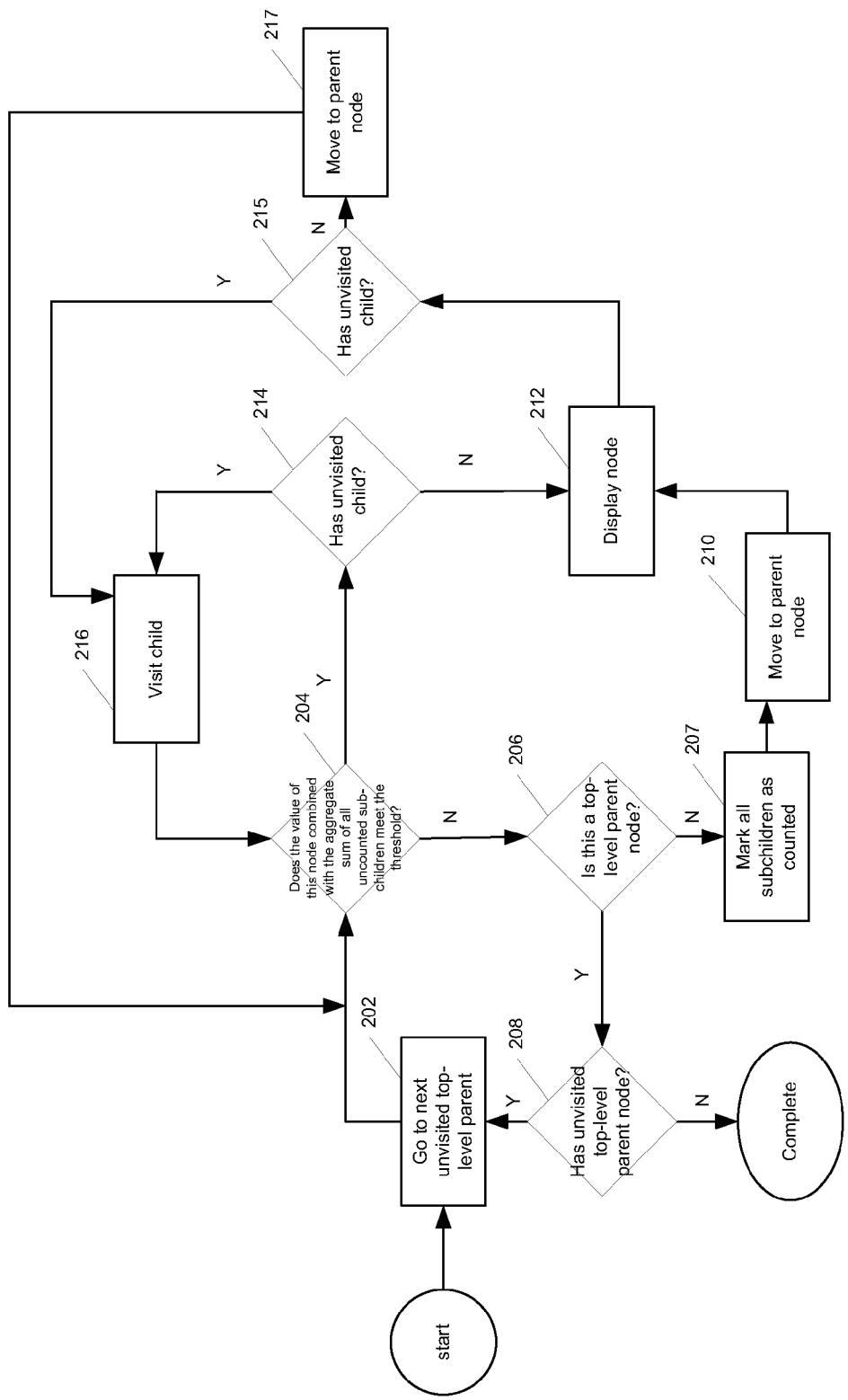
FIG. 2 is a flow chart of the process for reducing a complex tree structure to a simple tree structure based upon relevance in accordance with the present invention.

FIG. 2 is a flow chart of the process for reducing a complex tree structure to a simple tree structure based upon relevance in accordance with the present invention. In this process, proceed to an unvisited top-level parent, via step 202. Then it is determined if the aggregate value of this node and its children who have not yet been marked as counted meet the count threshold, via step 204. If it does not meet the threshold, then it is determined if the node is a top-level parent node, via step 206. If it is, then it is determined if there are any unvisited top-level parent nodes, via step 208, If there are no more, then complete. If there are more unvisited parents, return to step 202.

If on the other hand, the node is not a top-level parent node, via step 206, then mark all sub-children of this node as counted, via step 207, then move to the parent node, via step 210 and display node, via step 212. If the aggregate value meets the count threshold, via step 204, it is determined if the node has an unvisited child, via step 214. If the node has the child, then the child is visited, via step 206 and step 204 is reentered. If the node does not have the child, then the node is displayed, via step 216. Next, it is determined if the node has another unvisited child, via step 215, If the node has the uninvited child, then go to step 216. If the node does not have the unvisited child, then move to parent node, via step 217. Thereafter, return to step 204.

Accordingly, in this system each tree node and query all sub containers (directly or indirectly rooted) are queried for items that satisfy a particular rule (property 'OnHold=true" for example) is visited, count the results, and the count matches a specified threshold value, then move to the next child node. If a child node does not exist, then display the node. If not, visit each of the children in the node's entire sub-tree and return the parent node who has a child that can not satisfy the threshold or itself does not have children. This is repeated for every top level node.

Figure 3:
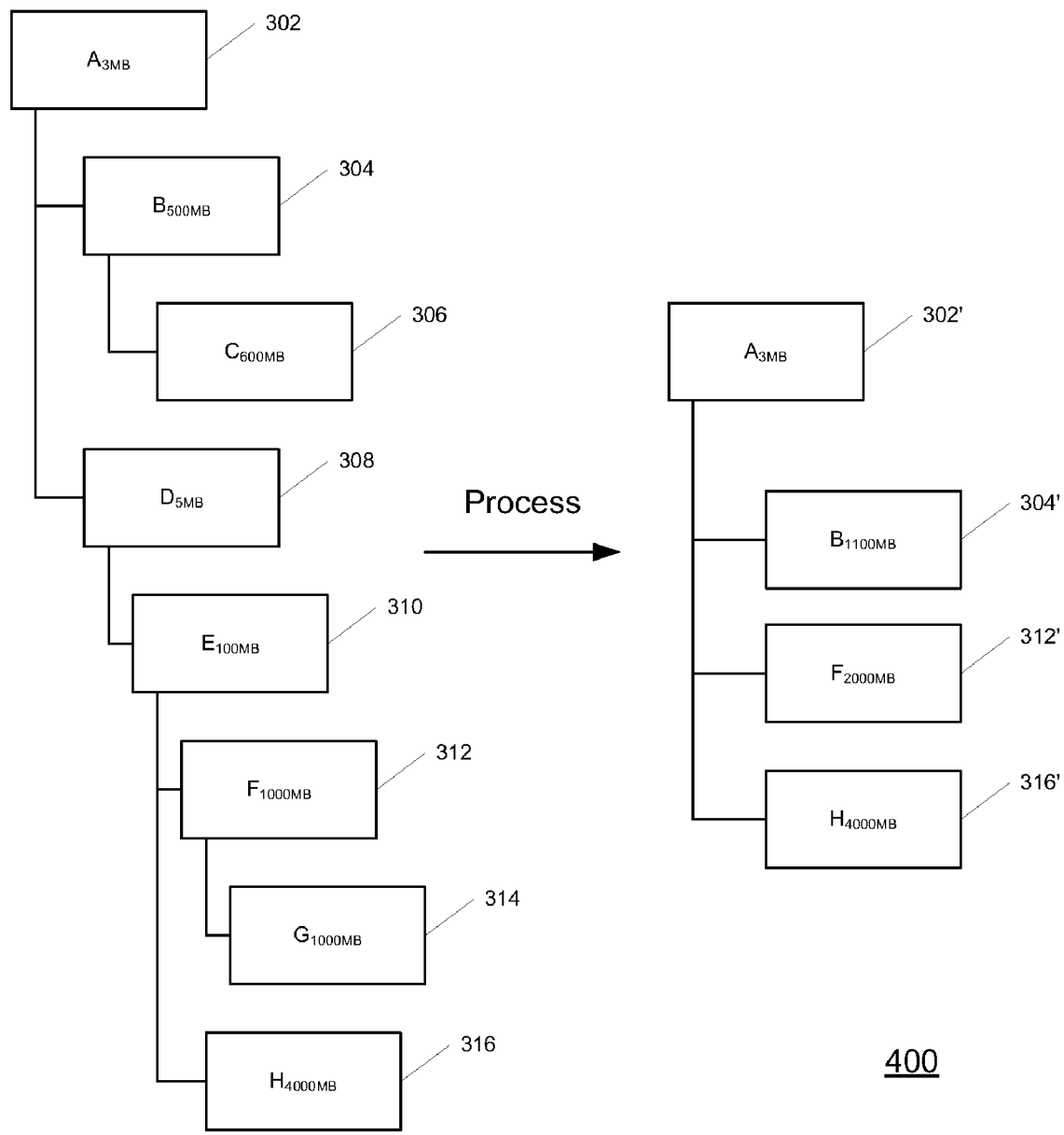
FIG. 3 illustrates a simple example of a reducing a tree structure in accordance with the present invention.

FIG. 3 illustrates a simple example of reducing a tree structure in accordance with the present invention. In this example a determination is made: Where is most of my data stored? In this example, each box with the complex tree 300 represents a node (or folder) 302, 304, 306, 308, 310, 312, 314 and 316. The subscripted value within each node indicates the number of megabytes (say files) contained by the node. In addition, megabytes are used to provide a more general visualization of the problem and solution.

The nodes 302', 304', 310', 312', and 316' of the reduced tree 400 are displayed utilizing the following rules:

1. The sum of megabytes of all files it contains and files its all children contain is greater than 1000 and;

2. The node has no children or the node has at least one child that does not satisfy rule (1).

Accordingly, utilizing these rules, node 302' would remain because it is the top-level parent, Node 304' would remain and include the files of node 304' and node 306 because it satisfies rules above. However, nodes 308 and 310 would not qualify since they do not satisfy the rules. As can also be seen each of the nodes can be activated to "drill down" to see what files are in each. As is seen, the tree structure 400 is significantly reduced through the use of this system. Although structure 300 is a relatively simple tree structure, one of ordinary skill in the art readily recognizes that as the number of nodes increase the utility of this system becomes more important.

A system and method in accordance with the present invention creates a simple view of a complex taxonomy according to some limited context information (or discover information). For instance, you may want to see the taxonomy from the point-of-view of records that have "IBM" somewhere in the title property. So, build a taxonomy from folders that contain records that have 'IBM" somewhere in the title property (threshold=1). This alone may still render a complex (hard to view) taxonomy. Therefore, a threshold value can be configured for a particular environment. The threshold value only allows folders that meet that threshold to be displayed. This filters-out all folders above and below it that do not meet the threshold value. By doing this, a user may identity a pattern or area that is "search-worthy" and drill-down into one of the returned folders and discover what they are looking for. Taking the 'IBM' somewhere in the title property example, threshold value may be set to 100. In this example, the folder structure contains 500,000 folders. When utilizing a system and method in accordance with the present invention 50 folders may be returned (ordered in some hierarchal fashion). Now the ability to navigate through folders only containing 'IBM' somewhere in the title has been greatly simplified (from 500,000 to 50).

Accordingly, in this embodiment, for example, there are 500 folders with each folder including 50 hits. For the example above, a 'conceptual' way to view the method is like this. Start at the bottom-most folder in the folder structure and imagine that there is only one child for each parent. So, if the hierarchy is expanded you see one linear graph (like a stair-stepping ladder). While in the bottom-most folder, count the number of records having 'IBM' somewhere in the title. If the count is >=100, then include that folder in the simplified folder structure and set the count=0 (restart the counting). However, if the count is <100, do not reset the count to zero. Move up to the parent folder and count the qualifying records and test the count again. Continue this process until you have reached the top-most folder. According to the example above, we had 500 steps in the ladder, and now after running this process we should only have 50.

There are several examples in which a system and method in accordance with the present invention can be used. Some of them are described below:

Risk Tree

Companies may want to know which categories contain holds. A user may want to see a view of the management tree having only nodes that contain the records on hold or of a particular hold. An unfiltered view may contain hundreds of thousands of nodes, but a filtered view may only display a few nodes.

Assessment Tree

Companies may want to take an assessment of which categories are holding the majority of records. Within the hundreds of thousands of categories (nodes), there may be only a few categories that contain the majority of records. A filtered view would provide easy access and awareness to these categories.

Performance Prediction Tree

An IT department may be interested in knowing which categories will incur high volume activity for a given time period. Based on the displayed relevance tree, the IT personal can make appropriate hardware and software decisions. An example would be a relevance tree that displays three categories that will each dispose over four million items in the coming week. Those nodes containing the high volume of records to be disposed may be specifically targeted using the scaled-up hardware and processed across multiple application servers.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing a tree structure in a processing system comprising;
providing a plurality of nodes in a tree structure, wherein the plurality of nodes comprise parent nodes and children nodes;
querying each of the plurality of nodes based upon a threshold value, wherein the threshold comprises a value used to determine the relevance of each of the plurality of nodes, wherein threshold value comprises an aggregate count value of the records in a particular parent node and the records in the children nodes of the particular parent node; when a count of a particular node matches the threshold then a next child node is queried to determine if the next child node matches the threshold, wherein the count for the particular node comprises the number of records in a directory that satisfy a particular rule, when a child node does not exist for the queried next child node then the next child node is displayed;
determining when the particular node has an additional next child, responsive to the particular node having an additional next child, determining when an additional count of the additional next child matches the threshold;
visiting all parent nodes based on the querying step until all of the plurality of nodes have been queried; and
displaying the nodes that satisfy the threshold value, wherein each of the displayed nodes is a directory that is activated to determine the nodes therewithin.

2. A computer readable medium containing program instructions for reducing a tree structure in a processing system; the program instructions for:
providing a plurality of nodes in a tree structure, wherein the plurality of nodes comprise parent nodes and children nodes;
querying each of the plurality of nodes based upon a threshold value, wherein the threshold comprises a value used to determine the relevance of each of the plurality of nodes, wherein threshold value comprises an aggregate count value of the records in a particular parent node and the records in the children nodes of the particular parent node; when a count of a particular node matches the threshold then a next child node is queried to determine if the next child node matches the threshold, wherein the count for the particular node comprises the number of records in a directory that satisfy a particular rule, when a child node does not exist for the queried next child node then the next child node is displayed;
determining when the particular node has an additional next child, responsive to the particular node having an additional next child, determining when an additional count of the additional next child matches the threshold;
visiting all parent nodes based on the querying step until all of the plurality of nodes have been queried; and
displaying the nodes that satisfy the threshold value, wherein each of the displayed nodes is a directory that is activated to determine the nodes therewithin.

3. A data processing system comprising:
a processor;
a memory coupled to the processor; and
a tree structure reducing cache to be executed by the processor; the tree structure reducing code comprising providing a plurality of nodes in a tree structure, wherein the plurality of nodes comprise parent nodes and children nodes; querying each of the plurality of nodes based upon a threshold value, wherein the threshold comprises a value used to determine the relevance of each of the plurality of nodes, wherein threshold value comprises an aggregate count value of the records in a particular parent node and the records in the children nodes of the particular parent node; when a count of a particular node matches the threshold then a next child node is queried to determine if the next child node matches the threshold, wherein the count for the particular node comprises the number of records in a directory that satisfy a particular rule, when a child node does not exist for the queried next child node then the next child node is displayed; determining when the particular node has an additional next child, responsive to the particular node having an additional next child, determining when an additional count of the additional next child matches the threshold; visiting all parent nodes based on the querying step until all of the plurality of nodes have been queried; and displaying the nodes that satisfy the threshold value, wherein each of the displayed nodes is a directory that is activated to determine the nodes therewithin.

* * * * *